United States Patent [19]
Fukuda

[11] Patent Number: 4,892,041
[45] Date of Patent: * Jan. 9, 1990

[54] GOLF CART SYSTEM

[76] Inventor: Tomiichi Fukuda, 3-23-18, Denenchofu, Ohta-ku, Tokyo, Japan

[*] Notice: The portion of the term of this patent subsequent to Apr. 25, 2006 has been disclaimed.

[21] Appl. No.: 116,254

[22] Filed: Nov. 3, 1987

[30] Foreign Application Priority Data

Nov. 5, 1986 [JP] Japan .................. 61-262932

[51] Int. Cl.$^4$ .......................................... B61B 13/10
[52] U.S. Cl. ................................................ 104/140
[58] Field of Search ............... 104/139, 140, 142–144, 104/242–247; 105/141

[56] References Cited

U.S. PATENT DOCUMENTS

| 432,204 | 7/1890 | McLaughlin | 104/139 |
|---|---|---|---|
| 1,679,068 | 7/1928 | Allen et al. | 104/139 X |
| 1,847,976 | 3/1932 | Oldham | 104/140 |
| 3,099,227 | 7/1963 | Bryan | 104/139 |
| 3,583,322 | 6/1971 | Vykukal | 104/1 |
| 3,838,648 | 10/1974 | Dahlberg et al. | 104/139 |
| 3,859,925 | 1/1975 | Hartz | 104/140 X |
| 3,906,866 | 9/1975 | Knippel | 104/139 |
| 4,592,284 | 6/1986 | Fukuda | 104/140 |
| 4,671,184 | 6/1987 | Fukuda | 104/140 X |
| 4,823,705 | 4/1989 | Fukuda | 104/140 |

FOREIGN PATENT DOCUMENTS

| 2148373 | 9/1971 | Fed. Rep. of Germany. |
|---|---|---|
| 61-33363 | 2/1986 | Japan. |
| 1354888 | 5/1974 | United Kingdom. |
| 1367119 | 9/1974 | United Kingdom. |
| 1386655 | 3/1975 | United Kingdom. |
| 1594068 | 4/1977 | United Kingdom. |
| 215840 | 11/1985 | United Kingdom. |

Primary Examiner—Johnny D. Cherry
Assistant Examiner—F. H. Williams, Jr.
Attorney, Agent, or Firm—Fleit, Jacobson, Cohn, Price, Holman & Stern

[57] ABSTRACT

A golf cart system which can be installed on the fairway of a golf course and which is excellent in power economy and anti-overturn effect. The golf cart system includes a track embedded in the ground and a cart running on the track. According to the golf cart system, since the track width exposed at the ground is very narrow, there is little chance of a golf ball hitting against the track. Even if a golf ball should happen to accidentally hit the exposed track portion, the ball will bound similarly as when striking on natural grass if the exposed track portion is covered by elastic members such as artificial turf. This makes it possible to install the golf cart system on the fairway of a golf course. In addition, since the anti-overturn rollers are so arranged that they elastically press onto the side walls of the track, the load acting between the driving wheels and the track is only the dead weight of the cart itself and therefore no excessive frictional force acts therebetween.

1 Claim, 5 Drawing Sheets

_(Page 1 of patent 4,892,041)_

GOLF CART SYSTEM

BACKGROUND OF THE INVENTION

The present invention relates to a golf cart system for installation on a golf course and, more particularly, to a golf cart system which enables a golf cart to run on the fairway of a golf course.

Heretofore several types of golf carts for carrying golfers or golf equipment have been known. These include, for example, three- and four-wheeled carts driven by a battery-powered electric motor or a small internal combustion engine. However, these carts are not suitable to be run on a golf course because their tires would come in direct contact with the grass and is likely to damage the grass. Accordingly, they have to be run on the rough or on a paved path running at the side of the rough. Recently there have been developed golf cart systems adapted to run on rails embedded in the ground of the golf course. The carts of this type do not damage the grass but, since such prior art golf cart systems use rails having a wide top surface exposed above the ground of the golf course, there is a risk that the rails will interfere with the golfers' game, as when a golf ball lands on the exposed rail surface. Thus the golf cart systems of the prior art using embedded rails also have to be installed at a place outside the rough.

When a golf cart is installed at a place outside the rough and far from the fairway, the players or their caddies have to walk back and forth between the fairway and the cart whenever they change golf clubs. This is not only troublesome for the players and caddies but also delays the progress of the game.

For solving this problem, the applicant of the present application previously developed a novel embedded-rail type golf cart system which can be installed on the fairway as disclosed, for example, in Japanese Laid-open Patent Publication No. 33363/1986. This golf cart uses a track having a very narrow top surface exposed above the ground so that there is little chance of a golf ball hitting against the track even though the track is laid across the fairway.

However, since the golf cart disclosed in Japanese Laid-open Patent Publication No. 33363/1986 is constructed such that driving wheels running on a lower running surface of the track and anti-overturn wheels running on an upper running surface of the track are strongly urged by springs against the lower and upper running surfaces, a heavy load (not only the dead weight of the cart itself but also the reaction force of the springs) is always applied between the driving wheels and the lower running surface of the track. This causes an excessive frictional force therebetween and also wastefully increases the consumption of the battery power or the gasoline used for driving the cart and, as a result, the distance that the cart can travel per charge of the battery or per tank of gasoline is shortened.

SUMMARY OF THE INVENTION

It is an object of the present invention to provide a golf cart system which can be used on the fairway of a golf course and which is excellent both in power efficiency and in anti-overturn effect.

For achieving the object of the present invention, there is provided, according to the present invention, a golf cart system including a track embedded in the ground and a cart adapted to run along the track characterized in that: said track comprises a generally horizontally extending bottom wall, a pair of opposed side walls generally vertically extending from the bottom wall, and top walls extending toward the center of the track from upper ends of the side walls to define a groove therebetween; said cart comprises a base frame, supporting posts vertically and downwardly extending from the base frame into the track through the groove, a wheel supporting frame mounted on the supporting posts and being movable within the track, driving wheels mounted on the wheel support frame and driven by a power source to run on the inner surface of the bottom wall of the track, and rollers mounted on the wheel supporting frame and urged against the inner surfaces of the side walls.

According to the present invention, since the anti-overturn rollers are adapted to be urged against the inner surface of the side walls of the track, no reaction force from the anti-overturn rollers is applied to the inner surface of the bottom wall of the track on which the driving wheels run. That is, since only the dead weight of the cart itself acts between the driving wheels and their running surface (i.e. no excessive frictional force acts therebetween), it is possible to reduce the consumption of electric power or gasoline by the source of driving power.

BRIEF DESCRIPTION OF THE INVENTION

Other objects and advantages of the present invention will become apparent from the following detailed description of a preferred embodiment of the present invention taken in reference to the accompanying drawings in which.

DESCRIPTION OF THE PREFERRED EMBODIMENT

Figure 1:
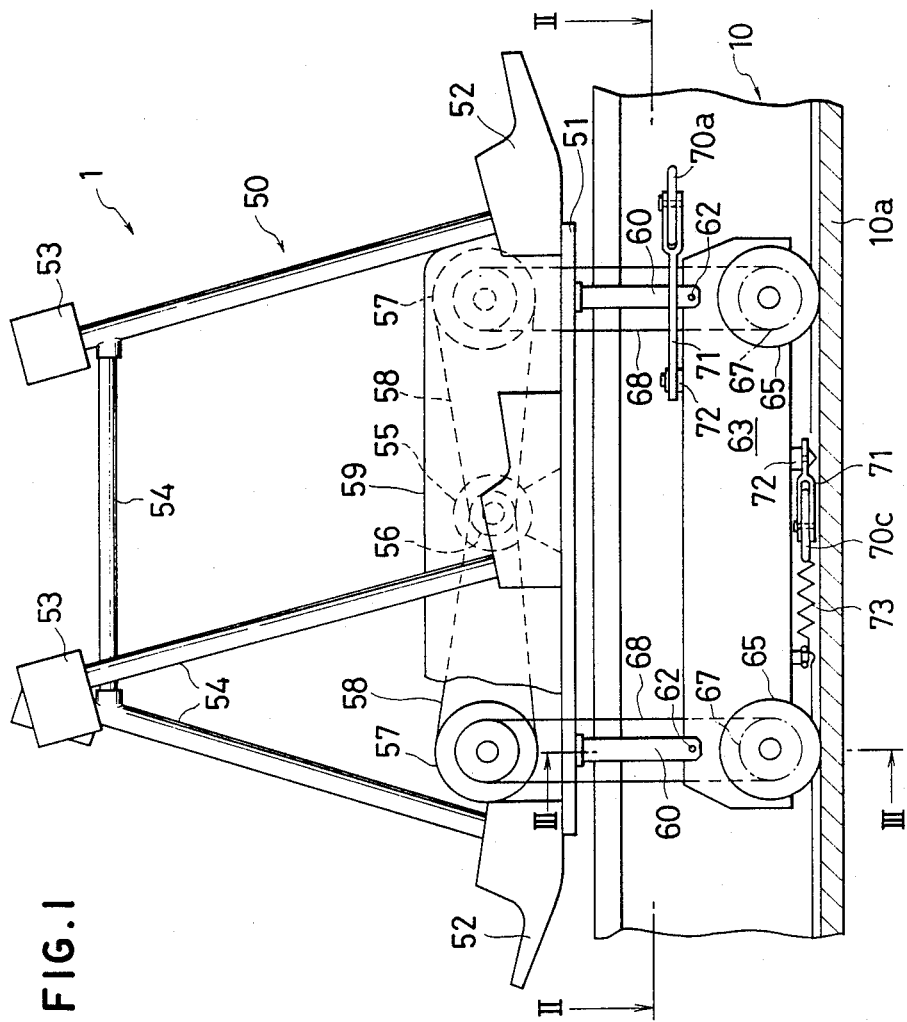
FIG. 1 is a cross-sectional side elevation of a golf cart of the present invention schematically showing the structure of a cart and a track thereof.
Figure 3:
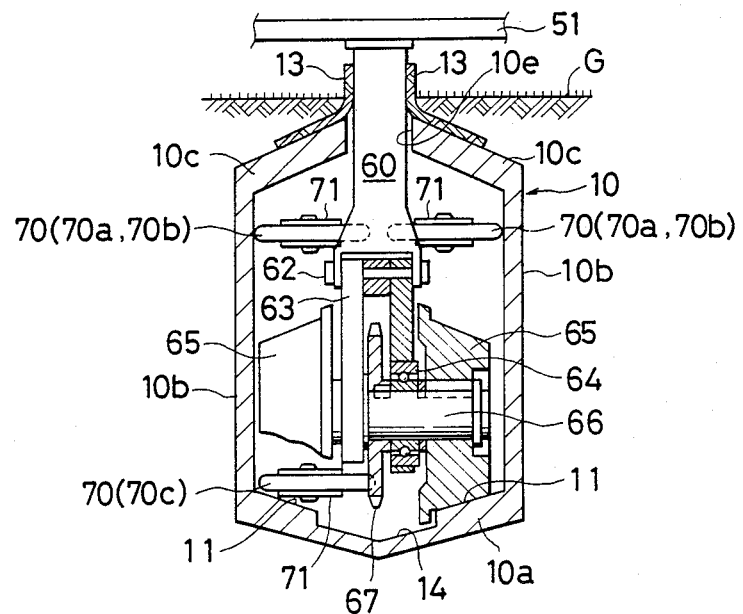
FIG. 3 is a cross-sectional end view of the track taken along the line III—III of FIG. 1.

As shown in FIG. 1, a golf cart system 1 of the present invention includes a track 10 and a cart 50 which runs along the track 10. The detailed structure of the track 10 will be described with reference to FIG. 3. The track 10 of the golf cart system 1 of the present invention comprises a bottom wall 10a, a pair of oppositely facing side walls 10b generally vertically extending from the bottom wall 10a, and top walls 10c extending from the top ends of the side walls 10b toward the center of the track 10 to define as track groove 10e therebetween. Formed on the inside of the bottom wall 10a are running surfaces 11 on which the driving wheels 65 run. As can be seen in FIG. 3, the width of the groove 10e is much smaller than the overall width of the track 10, i.e.

than the distance between the opposing side walls 10b and 10b. More specifically, the groove 10e is slightly larger than the diameter of a golf ball and therefore the width of the portion of the track exposed at the ground (the grass surface) G is also very narrow, there is little chance of a golf ball hitting against the track 10 even if the track 10 is embedded in the fairway of a golf course. This makes it possible to install the golf cart system 1 of the present invention in the fairway of a golf course.

The cart 50 has a base frame 51 on which supporting beds 52 and pillows 53 for supporting golf bags and other golf equipment are mounted via pipe frames 54. The base frame 51 also supports thereon a power source such as an electric motor (or a small internal combustion engine) 55 for driving the cart 50, a pulley (or sprocket) 56 secured to the output shaft of the motor 55 and intermediate pulleys (or sprockets) 57. The power from the motor 55 is transmitted to the intermediate pulleys 57 via belts (or chains) 58. All the components are concealed by a cover 59. The cart 50 shown in FIG. 1 is designed for carrying only golf equipment. However, other types of carts for passengers or for both passengers and golf equipment may be designed.

Supporting posts 60 extends vertically and downwardly from the under side of the base frame 51 through a track groove 10e into the interior of the track 10, as best shown in FIG. 3. A wheel supporting frame 63 is mounted on the posts 60 via pins 62. As shown in FIGS. 1 and 3, driving wheels 65 are rotatably mounted on the frame 63 via bearings 64. A pulley (or sprocket) 67 is secured to the axle shaft 66 of each of the driving wheels 65 and a belt (or chain) 68 is wound around the pulley 67 and the intermediate pulley 57. Thus, the power of the motor 55 is transmitted to the driving wheels 65 via the belts 58, intermediate pulleys 57, belts 68 and pulleys 67 so that the driving wheels 65 can run on running surfaces 11 formed on the bottom wall 10a. As can be seen in FIG. 3, the running surfaces 11 are inclined downwardly toward each other to be suitable for truncated-conically shaped driving wheels. However, they may be formed as horizontal surfaces suitable for use with cylindrical driving wheels.

It is preferable to mount, on the top surfaces of the top walls 10c, groove covers 13 of suitable elastic material such as rubber or artificial turf which are usually in a closed condition but are opened by the posts 60 when the cart 50 moves along the track 10. The provision of the groove covers 13 makes it possible to prevent irregular bouncing of golf balls if they should accidentally hit the track 10 and also prevents the entry of dirt or other debris such as dead leaves into the track 10. A recess 14 may be formed generally at the center of the bottom wall 10a so as to form a trough for rainwater entering the track.

Figure 2:
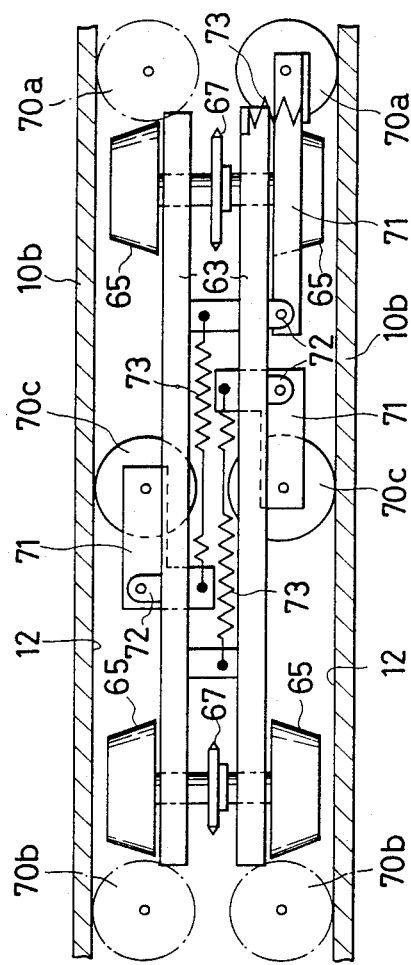
FIG. 2 is a cross-sectional plan view taken along the line II—II of FIG., 1.

The golf cart system 1 of the present invention is provided with anti-overturn rollers 70 for preventing lateral overturn of the cart 50. The anti-overturn rollers 70 roll along the inner surfaces of the side walls 10b of the track 10 with the rollers 70 urged thereagainst. As clearly shown in FIG. 2, the anti-overturn rollers 70 comprise front rollers 70a, rear rollers 70b and central rollers 70c. All these rollers 70a, 70b and 70c are rotatably mounted on arms 71 which, in turn, are pivotably mounted on brackets 72 secured to the wheel supporting frame 63. Springs 73 act to urge the rollers 70a, 70b and 70c against the inner surfaces of the side walls 10b. In the preferred embodiment of FIG. 2, the springs 73 for urging the central rollers 70c act as tension springs and the springs 73 for urging the front and rear rollers 70a and 70b act as compression springs. For clarity in the drawings, the arms 70 and springs 73 for one of the front rollers 70a and rear rollers 70b are omitted from FIG. 2.

Figure 4:
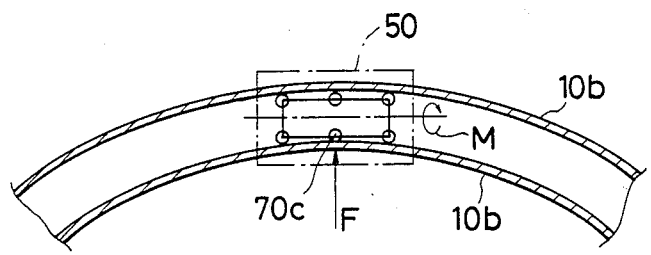
FIG. 4 is an explanatory view showing forces acting on the cart and the track when the cart travels along a curved track portion.

As can be seen in the preferred embodiment of FIGS. 1 and 3, the front and rear rollers 70a and 70b engage the side walls 10b at upper positions thereof whereas the central rollers 70c engage the side walls at lower positions thereof. The arrangement in which in addition to the front and rear rollers 70a and 70b, the central rollers 70c are provided to engage the lower portions of the side walls 10b, makes it possible to increase the returning moment which acts to restore the cart 50 to its vertical attitude in resistance to an overturning moment (the "overturning moment" meaning a moment acting to overturn the cart 50 radially outward when the cart 50 travels on a curved portion of the track 10). The reason for this will be described with reference to FIG. 4. When the cart 50 travels on a curved track 10, the central roller 70c located on the radially inward side of the cart 50 bears strongly against the side wall 10b of the radially inward side of the track 10 and is pushed by a strong reaction force F from the side wall 10b. Since the central roller 70c engage the side wall 10b at a lower position thereof, the reaction force F effectively acts to restore the cart 50 to its vertical attitude in resistance to the overturning moment M.

Figure 5:
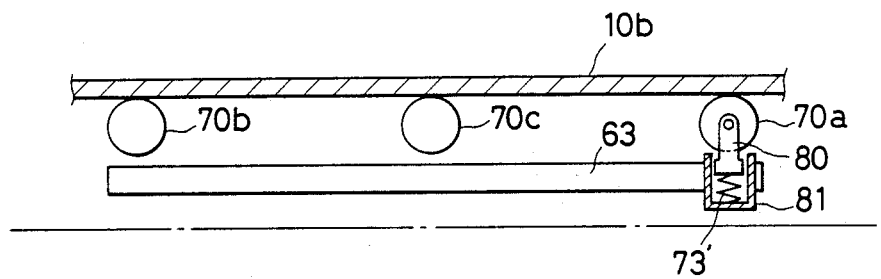
FIG. 5 is a partial cross-sectional view showing a second embodiment of a supporting structure for anti-overturn rollers of the cart.

FIG. 5 shows a second embodiment of the golf cart system 1 of the present invention. In this embodiment, each of the anti-overturn rollers 70a, 70b and 70c is directly urged by springs 73' against the side walls 10b without using the arms 71 of the first embodiment. Each roller is supported on a rod 80 slidably mounted in a box member 81 accommodating the spring 73' therein and is adapted to be pushed out toward the side wall 10b by the spring 73' arranged between the rod 80 and the box member 81.

Figure 6:
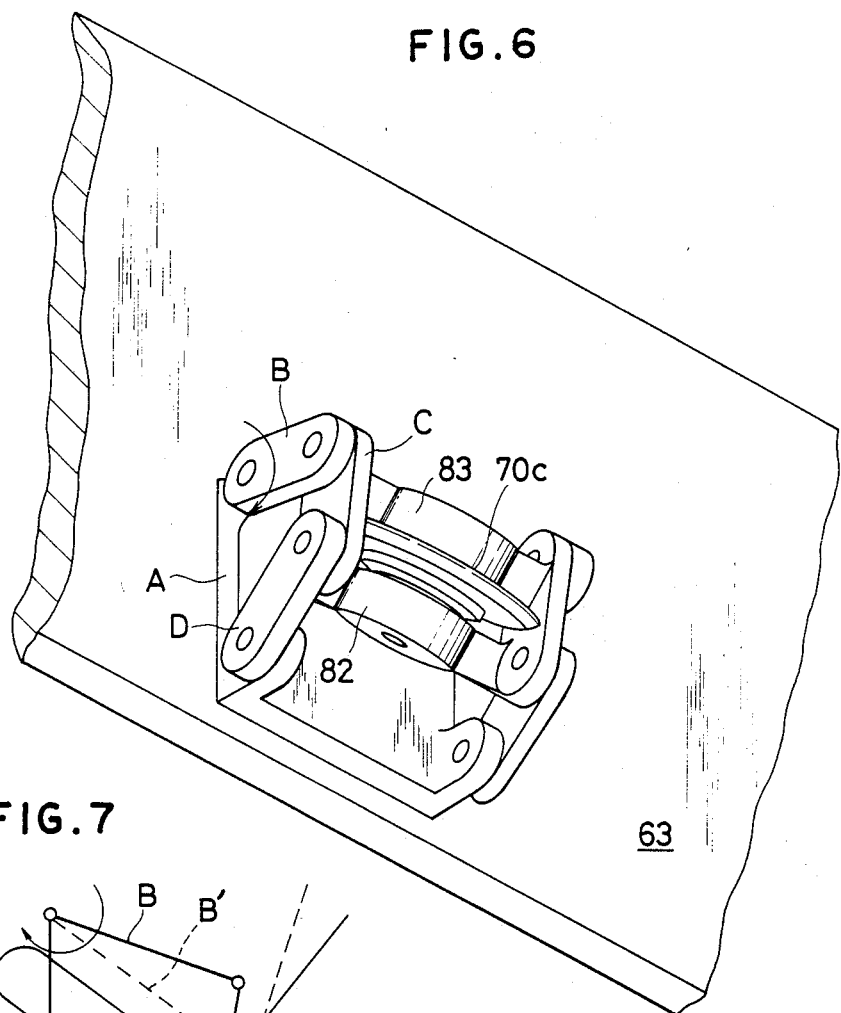
FIG. 6 is a perspective view showing a third embodiment of a supporting structure for anti-overturn rollers of the cart.
Figure 7:
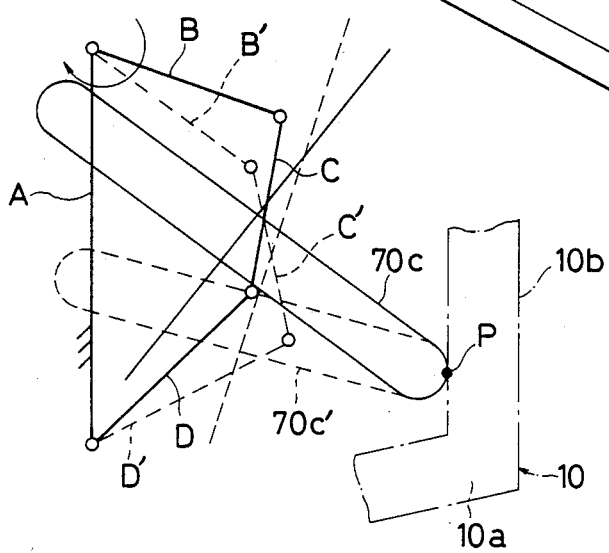
FIG. 7 is an explanatory skelton view showing the action of the roller supporting structure of FIG. 6.

In a third embodiment of the golf cart 1 of the present invention, each of the anti-overturn rollers 70a, 70b and 70c is supported on a "quadric crank chain mechanism" comprising four links. FIG. 6 shows one example of the quadric crank chain mechanism wherein the central roller 70c is attached to the wheel supporting frame 63. A link A is secured to the wheel supporting frame 63, a link B is pivotably mounted on the link A, a link C is pivotably mounted on the link B, and a link D is pivotably mounted on both the links C and D. The roller 70c is rotatably mounted on the link C via bearings 82 and 83. If the link B is urged by a spring (not shown) in the direction shown by the arrow, the roller 70c is also urged against the side wall 10b of the track 10. With this supporting arrangement of the rollers 70a, 70b, and 70c by the quadric crank chain mechanism, it is possible to maintain the contacting point of the rollers relative to the side walls 10b substantially constant even if the diameter of the rollers is reduced due to wear. FIG. 7 is a schematic view of the structure of FIG. 6 and shows two cases wherein a new roller 70c (shown by a solid line) and a used roller 70c having a reduced by wear diameter (shown by a dotted line) contact with the side wall 10b, respectively. The links A, B, C and D assume the positions shown by the solid lines when the roller 70c is still new. On the other hand, the links B, C and D move to the positions B', C' and D' shown by the dotted line when the roller 70c is worn during use (the link A does not shift its position since it is secured to the wheel supporting frame 63). Thus, the roller 70c contacts the side wall 10b substantially at a constant position P. To this end, the length of each link and the angle of the roller relative to the link C may be appropriately determined based upon the dimensions of, for example, the diameter of the rollers and the distance between the wheel supporting frame 63 and the side wall 10b.

According to the golf cart system of the present invention, since the width of the track exposed at the ground level is very narrow, there is less chance a golf ball hitting against the track. Even if a golf ball should happen to accidentally hit the exposed track portion, the ball will bounce similarly as when hitting natural grass if the exposed track portion is covered by elastic members such as artificial turf. This makes it possible to install the golf cart system of the present invention on the fairway of a golf course. In addition, since the anti-overturn rollers are so arranged such that they elastically urge the side walls, the load acting between the driving wheels and the rail is only the dead load of the cart itself and, therefore, no excessive frictional force acts therebetween. This reduces the consumption of electric power or gasoline used by the power source and thus increases the traveling distance of the cart per battery charge or tank of gasoline.

What is claimed is:

1. A golf cart system comprising:
a track adapted to be embedded in the ground,
a cart adapted to run on said track,
said track including
a bottom wall,
a pair of opposed side walls extending generally vertically from said bottom wall, and
top walls extending toward a center of said track from upper ends of said side walls to define a groove therebetween,
said cart including
a base frame,
supporting posts extending vertically and downwardly from said base frame through said groove into said track,
a wheel supporting frame mounted on said supporting posts and being movable within said track,
driving wheels mounted on said wheel supporting frame and driven by a power source to run on the inner surface of the bottom wall of the track,
front, rear and central anti-overturn rollers for preventing lateral overturn of said cart and engaging inner surfaces of said side walls, said front and rear rollers engaging said side walls at upper positions thereof and said central rollers being located between said front and rear rollers and engaging the inner surfaces of said side walls at lower positions thereof,
compression spring means for biasing said front rollers and said rear rollers against said side walls, and
tension spring means for biasing said central rollers against said side walls.

* * * * *